April 4, 1950          G. A. PHILBRICK          2,503,213
PROCESS AND CONTROL ANALYZER
Filed Dec. 21, 1946          4 Sheets-Sheet 2
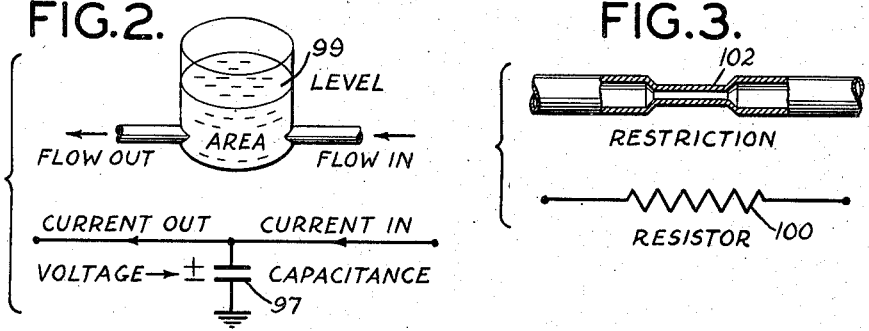
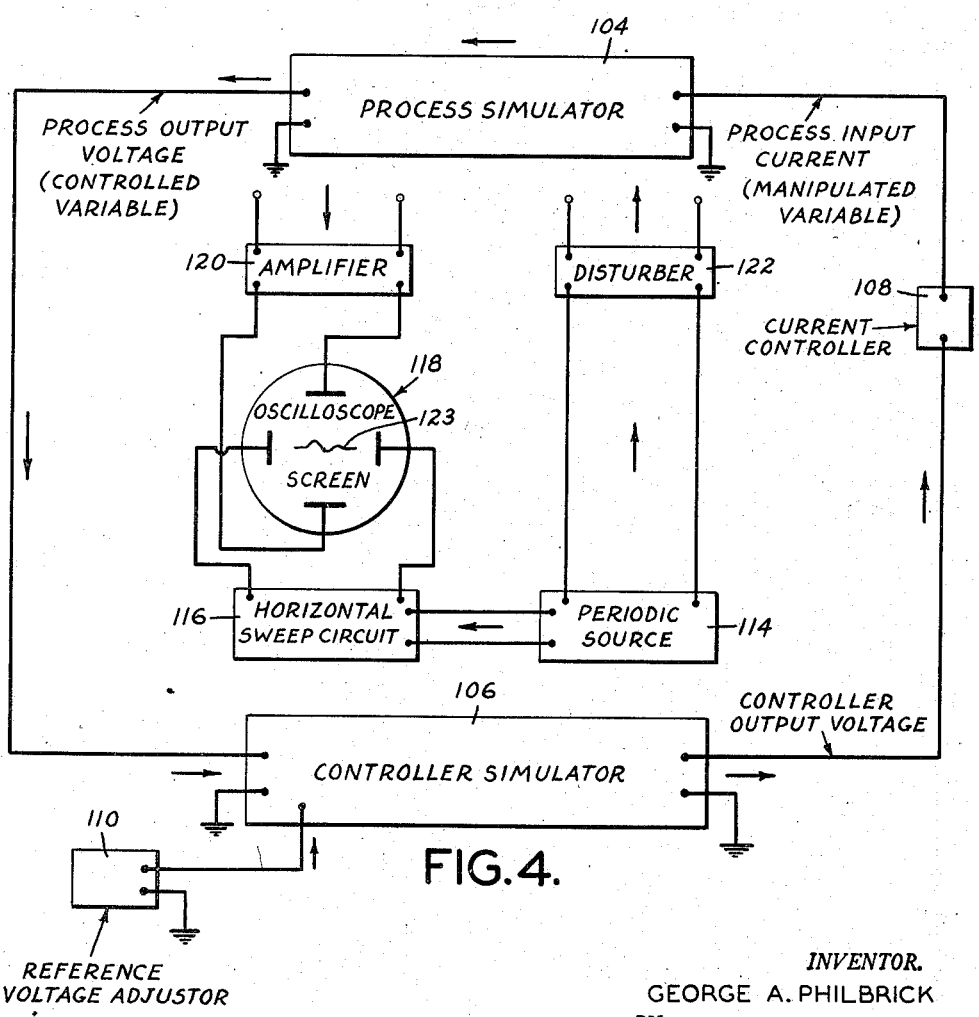
INVENTOR.
GEORGE A. PHILBRICK
BY
Blair, Curtis & Hayward
ATTORNEYS.

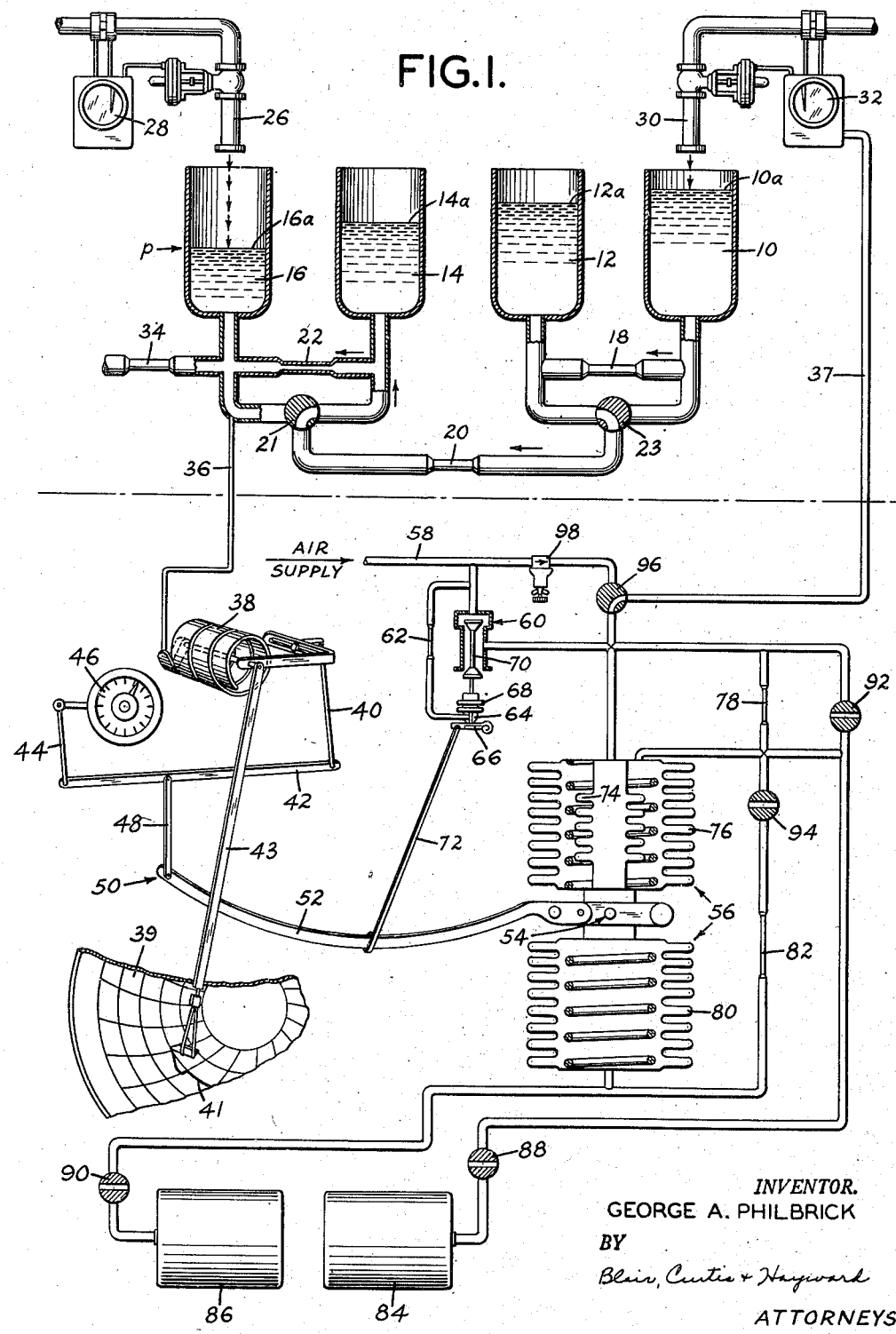
FIG.I.

April 4, 1950  G. A. PHILBRICK  2,503,213
PROCESS AND CONTROL ANALYZER
Filed Dec. 21, 1946  4 Sheets-Sheet 3
FIG. 5.
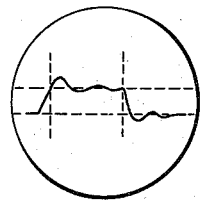
FIG. 6.
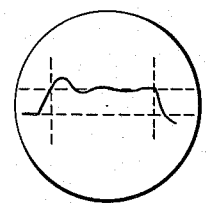
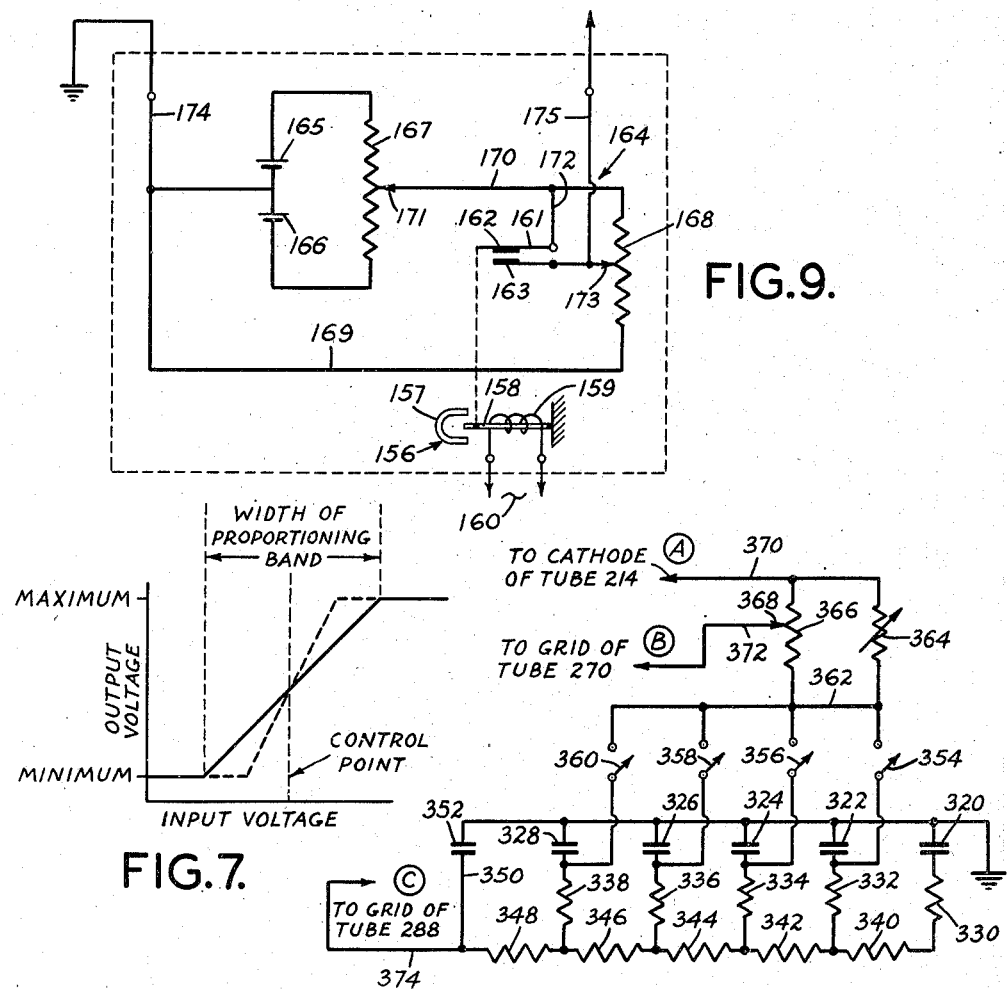
INVENTOR.
GEORGE A. PHILBRICK
BY
Blair, Curtis & Hayward
ATTORNEYS.

April 4, 1950 G. A. PHILBRICK 2,503,213
PROCESS AND CONTROL ANALYZER
Filed Dec. 21, 1946 4 Sheets-Sheet 4

INVENTOR.
GEORGE A. PHILBRICK
BY
Blair, Curtis & Hayward
ATTORNEYS.

Patented Apr. 4, 1950

2,503,213

UNITED STATES PATENT OFFICE 2,503,213

PROCESS AND CONTROL ANALYZER

George A. Philbrick, Cambridge, Mass., assignor to The Foxboro Company, Foxboro, Mass.

Application December 21, 1946, Serial No. 717,665

6 Claims. (Cl. 235—61)

This invention relates to process and controller analysis and more particularly to apparatus comprising electrical analogues of various process and controller elements capable of being interconnected to simulate different types of processes and controllers to permit the effect of a predetermined disturbance pattern on a process or a controller or a combination of process and controller to be conveniently predicted and studied. Processes simulated by the apparatus of the present invention may be industrial processes wherein control is effected by regulating a manipulated variable such as heat or the flow of a fluid, or they may be purely mechanical processes such as, for example, aiming a gun. The controllers simulated by the present apparatus may be the usual types of industrial process controllers for controlling temperature, pressure, flow, liquid level and the like, or they may be servomechanisms of the type used in ordnance fire control. The term process is used herein to comprehend any operation that is automatically controllable by regulating some condition governable by mechanical or electrical means and the term controller covers any mechanical or electrical means for automatically controlling such a process.

The analysis of a moderately complex process, or controller, or combination of process and controller, to determine the type of controller best suited to a particular process and the manner in which the controller should be adjusted to achieve optimum control presents many difficult problems and numerous efforts have been made to provide analytical techniques and tools for simplifying or otherwise facilitating solution of the problems encountered. In theory the desired information may be obtained by a purely empirical approach or by a semi-empirical approach or by a purely theoretical approach, but in practice the utility of these approaches is frequently seriously circumscribed by a variety of limitations, particularly in the case of complex processes that are difficult to control.

The approach that has been perhaps most widely used is the purely empirical approach wherein a controller is selected, installed and adjusted in situ by a trial-and-error method to obtain the adjustment that produces most effective control of the variable process condition to be controlled. In the case of some processes, this purely empirical approach is reasonably satisfactory since the nature of the process is such that the type of controller and the manner in which the controller should be adjusted can be predicted within relatively narrow limits on the basis of a general knowledge of automatic control and controllers. In the case of certain more complicated processes, on the other hand, the predictability of the prerequisites for achievement of optimum control is much less. Also if a complicated process is to be effectively controlled it is in general necessary to use a more complicated type of instrument having a greater variety of adjustable components and thus there are more adjustments for which the optimum value must be determined. It is evident that as the number of adjustable instrument components is increased, the difficulty of determining the proper combination of values of the different adjustable factors increases very rapidly. Moreover, complicated processes in, for example, the chemical and petroleum industries, frequently take a long period of time to balance out after a predetermined disturbance has been impressed upon the process and thus it is often necessary to wait quite a while after making each adjustment of the controller in order to determine what the effect of that adjustment will be on the interactions of the process and controller. Hence a considerable overall period of time may be required to arrive at optimum adjustment of the controller for a complex process.

Even where the nature of the process is such that it balances out rapidly the empirical approach is open to a number of objections. As pointed out above this approach involves a trial-and-error procedure and hence necessarily interferes to some extent with the normal and desired operation of the process. In some cases materials in process may be damaged or lost during the period when tentative control adjustments are being made. Furthermore an empirical approach can be used only after the process has been placed in operation. In some cases the controllability of a process can be materially improved by proper engineering design. One of the defects of the empirical approach is that it is incapable of providing information that can be used as a basis for design of a process that is more easily controllable because of the fact that the approach can be used only after the process has been placed in operation.

In order to overcome the foregoing difficulties various theoretical approaches to the solution of automatic control problems have been suggested. It will be helpful in understanding the nature of the present invention to describe briefly one quasi-theoretical approach that has been found useful in obtaining information concerning the prerequisites for achieving optimum control of complex processes and this approach will be described with reference to Fig. 1 of the drawings which illustrates diagrammatically a process with a known type of automatic controller applied thereto. The controller shown in Fig. 1 is generally similar to the controller described in detail in my prior Patent 2,360,889.

Most processes may be approximately resolved into a relatively small number of basic elements or factors, namely, resistance, capacity and inertia. For example, most industrial processes may be considered as made up of combinations of interconnected resistances and capacities. The degree of difficulty of an industrial process from the standpoint of automatic control is partly a function of the number of capacities and resistances that are disposed in series between the input and output of the process.

Another characteristic of a process that should be taken into account in automatic control is in the inherent speed of the process in responding to impressed disturbances of either a controlled or uncontrolled character, e. g., the time it takes for the controlled variable to come to a state of approximate balance following a change in either the manipulated variable or the demand. This inherent speed of the process is largely independent of the previously described degree of difficulty that the process offers to automatic control, but does place a limitation on the rapidity with which the controller may operate to cause the controlled variable to balance out at the desired value or control point following a deviation therefrom.

As a first step in process analysis it is useful to formulate a hydraulic analogue of the process to be considered both because such an analogue lends itself particularly well to mathematical treatment and also because it provides a means whereby the interactions of the different components of the process may be more readily perceived and understood. Such a hydraulic analogue of a typical multiple-capacity process is shown in the upper portion of Fig. 1. Referring to Fig. 1 the process analogue there shown comprises a series of four tanks connected in series through three resistances in the form of restricted passages. The tank 10 is connected to tank 12 through restriction 18; tank 12 to tank 14 through restriction 20; and tank 14 to tank 16 through restriction 22. The tanks 10, 12, 14 and 16 are filled with water to the levels 10a, 12a, 14a and 16a, respectively. A pair of three-way valves 21 and 23 are provided which may be operated to alter the manner in which the tanks are interconnected and thus permit the hydraulic analogue to simulate a variety of different processes. However in the following discussion it will be assumed that the tanks are connected in series as shown in Fig. 1.

Water is added to tank 16 of the hydraulic system from a pipe 26 wherein the flow of water is maintained at a desired value by a flow controller 28 and to tank 10 of the system through a pipe 30 wherein the flow of water is controlled by a flow controller 32. Water flows out of the hydraulic system continuously through the restriction 34. It may be noted that water added to tank 10 flows successively through tanks 12, 14 and 16 and out through restriction 34 and that the rate of discharge from any tank depends upon the resistance of the restriction connected to the tank discharge and upon the amount by which the height of the water level in that tank exceeds the height of the water level in the next succeeding tank of the series. It will be assumed that it is desired to maintain the level 16a of tank 16 at the point $p$ and it is evident that this level can be maintained constant only when the inflow through pipes 26 and 30 equals the outflow through restriction 34.

The flow of water from pipe 26 into the tank 16 represents the "demand" on the process, that is, it represents a flow which in an actual process would be essentially uncontrolled and uncontrollable but which in the present analogue is made adjustable to predetermined values so that the effect on the process of predetermined changes in demand may be studied. The flow through the pipe 30 into tank 10 is the regulated flow, i. e., the manipulated variable of the process that is used to bring the controlled variable, e. g., the liquid level 16a of tank 16, back to its desired value $p$ when a change in demand, e. g., a change in flow through pipe 26, occurs. Thus by adjusting the flow controller 28 to adjust the flow through pipe 26 the effect on the process of predetermined changes in demand may be studied and by adjusting flow controller 32 to adjust the flow through pipe 30 the effect on the process of predetermined correctional flows may be studied.

The speed of the process is a function of the cross-sectional areas of tanks 10, 12, 14 and 16. For example, if the tanks 10, 12, 14 and 16 are made very narrow so that they have small capacities, the controlled variable may be made to return to and remain at its control point within a relatively short period of time. Such a process is a fast process and the controller for the process is so adjusted as to bring the process to its new equilibrium rapidly. If, on the other hand, the tanks 10, 12, 14 and 16 have large cross-sectional areas, then with the same change in the manipulated variable the process would come to an approximately balanced condition only after a much longer period of time. Such a process is a slow process and a controller applied thereto must be so adjusted as to bring the process to balance slowly.

The operation of the hydraulic analogue of Fig. 1 is as follows: Assume first that the hydraulic system is in equilibrium with the level 16a at its desired value $p$ and that the controller 28 is then manually set to reduce the flow from pipe 26. It is evident that the level 16a will fall and that the level can be returned to and maintained at the point $p$ only by an increase in flow of water from tank 14 into tank 16 equal to the decrease in flow from pipe 26. In order to increase the flow of water from tank 14 through resistance 22 into tank 16 to the extent necessary to maintain level 16a at point $p$ with a reduced flow through pipe 26 it is necessary that the water level 14a in tank 14 rise to provide the additional driving force required. But such an increase in level in the tank 14 can be effected only by additional flow from tank 12 to tank 14 which in turn requires additional flow from tank 10. Thus in order to return the level 16a to its original value $p$ it is necessary that the levels 10a, 12a and 14a in each of tanks 10, 12 and 14, respectively, rise and that the flow through pipe 30 be increased to cause these levels to rise. It is further evident that if the manipulated flow 30 is changed to meet the new demand the levels 10a, 12a and 14a will reach their new equilibrium positions at different times and hence the rate at which a change in the controlled flow returns the level 16a to its desired value will vary with time and will be substantially less than its maximum value at the instant that a change in the controlled flow 30 is made. If upon a change in flow in the pipe 26 the flow through pipe 30 were altered to that value which would, without further change, bring the level 16a back to the desired point p the level 16a would drop appreciably before returning to the value p, and an excessive amount of time would be required to establish the new equilibrium. Therefore it is desirable that an initial excess correction be made in the controlled flow which is subsequently removed. This excess correction acts to increase the rate of flow of water into the several tanks and thus reduces the time required for establishment of a new equilibrium, but it is also important that the excess correction be removed at the proper time in order to prevent the building up within the tank system of an inordinately large level-restoring influence which would eventually cause the level 16a to rise above the desired control point p. In other words, the nature of the process is such that a carefully controlled excess correction is necessary for optimum control.

The behavior of easy and difficult processes and slow and fast processes is described in greater detail in my Patent No. 2,360,889 and is illustrated by a series of curves therein.

In the lower portion of Fig. 1 there is diagrammatically illustrated an automatic controller that is capable of applying correctly proportioned excess corrections to the process and is also capable of taking into account the inherent speed of the process in retaining the level 16a to and balancing it out at the value p. The controller is responsive, through a pipe 36, to the level 16a in tank 16 and produces a pneumatic pressure that is transmitted through a pipe 37 to the flow controller 32 to cause the controller 32 to vary the flow through pipe 30 in accordance with predetermined functions of the behavior of the level 16a. Pipe 36 leads to a responsive element 38 which positions a link 40 in accordance with the level in the tank 16. Link 40 is connected to one end of a differential link 42, the other end of which is connected by a link 44 to the control point adjusting mechanism 46 by means of which the value p at which the controller maintains the level 16a may be varied. The element 38 is shown as operating a pen arm 43 to indicate on a chart 39 the value of the level 16a. The curve 41 on chart 39 indicates an illustrative recovery transient of the level 16a.

The differential link 42 is connected by a link 48 with the end 50 of an arc lever 52, the other end of the arc lever 52 being mounted in a movable pivot 54 that is moved by a bellows assembly generally designated as 56 and described in more detail hereafter. Thus the end 50 of the arc lever 52 is positioned in accordance with the position of the level 16a in tank 16, and with the setting of the mechanism 46.

Air to operate the controller is supplied through a pipe 58 to a pneumatic relay 60 of the supply and waste type and through a restriction 62 to a control couple comprising a nozzle 64 and cooperating pivoted baffle 66. Air flows through the restriction 62 to and through the nozzle 64 and the flow of air through the nozzle is regulated by movement of the baffle with respect thereto. The pressure back of nozzle 64 communicates with the interior of a bellows 68 which operates the valve member 70 of the relay 60. Movement of baffle 66 with respect to nozzle 64 varies the pressure back of the nozzle and also the pressure in bellows 68 to cause the bellows to operate valve member 70 and thereby vary the output pressure of relay 60. When the baffle 66 is against the nozzle 64 the pressure in bellows 68 builds up to move valve member 70 to increase the output pressure of relay 60 and when baffle 66 moves more than a certain small distance away from the nozzle 64 the pressure within bellows 68 falls to move valve member 70 to decrease the output pressure of relay 60. The operative range of movement of baffle 66 required to produce a maximum change of relay output pressure is very small, i. e., of the order of 0.001 inch. For convenience the baffle will be characterized as "tangent" to the nozzle when it is within this small operative range.

The output pressure of relay 60 is conducted through pipe 37 to the controller 32 to set the control point thereof and thereby maintain the flow through pipe 30 into tank 10 at a value corresponding with the pressure in pipe 37. The output pressure of the relay is also conducted to the bellows assembly 56 which positions the end 54 of the arc lever 52, and the arc lever 52 in turn positions baffle 66 through a connecting link 72. The link 72 is adjustable along the arc lever to vary the relative effect on baffle 66 of movements of the ends 50 and 54 of the arc lever 52. The bellows assembly 56 operates to maintain the baffle 66 "tangent" to the nozzle 64 at all times, that is to say, when the end 50 of arc lever 52 moves in response to changes in the level in the tank 16, pressures are established in bellows assembly 56 of such magnitude that the end of arc lever 52 is immediately moved by the bellows assembly in a corresponding manner but in opposite sense to maintain the baffle 66 "tangent" to the nozzle.

The bellows assembly 56 comprises an upper inner (proportioning) bellows 74 that is directly connected to the relay output pressure, an upper outer (derivative) bellows 76 that is connected to the relay out pressure through a restriction 78 and a lower (reset) bellows 80 responsive to the relay output pressure through restriction 78 and through a second but relatively larger restriction 82. Capacity tanks 84 and 86 are provided which may be selectively connected to or disconnected from the bellows 76 and 80 respectively by the valves 88 and 90 respectively. A bypass valve 92 is provided for bypassing the restriction 78 when desired and a shutoff valve 94 is provided for disconnecting bellows 80 from the pneumatic system when desired.

To provide for manual control of the water supplied to the hydraulic system through pipe 30 there is connected to the air supply pipe 58 a three-way valve 96 that may be positioned to connect pipe 37 with the air supply through a pressure reducing valve 98 that may be manually adjusted to maintain a predetermined constant pressure in pipe 37.

In response to movements of the end 50 of arc lever 52 as the level 16a varies, the control couple 64—66, the relay 60 and the bellows assembly 56 cooperate to impose upon the pressure in pipe 37 three independent but contemporaneous control effects. The nature of these three control effects is such that the output pressure of the relay 60 (1) changes immediately, continuously and proportionally with changes of the position of the end 50; (2) changes quantitatively in proportion to the rate at which the end 50 moves, i. e., in proportion to the rate of change of the level 16a; and (3) changes at a rate proportional to the deviation of the end 50 from its neutral position and hence proportional to the deviation of the level 16a from the point p. These three effects are commonly characterized, respectively, as a proportioning effect, a derivative effect and a reset effect. The manner in which the control couple 64—66, relay 60 and bellows assembly 56 cooperate to produce this result is fully described in my Patent No. 2,360,889.

From the foregoing description it is apparent that when the controller is connected as indicated in Figure 1 the output pressure of the relay 60 adjusts the flow controller 32 in accordance with a composite control effect comprising a proportioning effect, a derivative effect and a reset effect. By opening valve 92 the derivative effect may be eliminated and by closing valve 94 the reset effect may be eliminated. Thus by suitable adjustment of the valves the controller may operate as a proportioning controller, a proportioning-plus-reset controller, a proportioning-plus-derivative controller, or a proportioning-plus-reset-plus-derivative controller.

As previously indicated a theoretical approach has been proposed in recent years which in many cases yields useful information concerning the characteristics of processes and the manner in which particular types of controllers and particular adjustments of control effects may be expected to affect the controlled variable of the process. In general this method comprises formulating the differential equations representing the operation of the process and the operation of the controller, combining the process and controller equations, inserting in the combined equation suitably selected values for the various constants of the process and controller and solving the equations to determine the behavior of the controlled variable, e. g., the level 16a, for a predetermined change in demand on the process, e. g., a change in flow through pipe 26. In many cases valuable information can be obtained from such a purely mathematical analysis. In other cases, however, particularly where the process is a relatively complicated one, the solving of the mathematical equations becomes extremely time consuming and in certain cases wholly impracticable. In other cases it may be desirable to study the effect of a number of different adjustments of the controller and in such cases the complicated process and controller equation must be solved for a number of different values, a procedure which requires a considerable period of time. Thus both the purely empirical and purely theoretical methods of analyzing complicated processes and controllers are in many cases excessively time consuming and there is a need for a more effective method of analyzing these problems. Such a method should be thoroughly flexible so that it can represent a wide variety of different systems. For example it should be capable of representing processes of different degrees of difficulty and instruments of different degrees of complexity and should permit desired adjustment of the primary process and controller characteristics. It should also be capable of representing the behavior of the system in some perceptible form, and the time required to manipulate the adjustments of the whole unit to cause it to simulate a given system, as well as the time elapsing before the results become perceptible, should be quite small. Moreover, the accuracy of the method and apparatus should be within the limits of observation, and the inherent consistency of operation of the apparatus should be unimpeachable.

Accordingly it is an object of the present invention to provide an improved method and apparatus for analyzing a process or a controller or a combination of process and controller. It is another object of the invention to provide apparatus of this character that is sufficiently flexible to permit simulation of a wide variety of processes and controllers. It is a further object of the invention to provide a process and controller analyzer wherein the values of the different components of the process and controller may be conveniently and rapidly adjusted. It is still another object of the invention to provide a process and controller simulator having very rapid reactions, that is, reactions sufficiently rapid so that when a rapidly recurring disturbance is impressed on the simulator the resulting individual recovery transients may be successively portrayed on a screen at such a speed that they cannot be separately distinguished by the eye and the separate transients merge into what appears to be a single transient. It is still another object of the invention to provide a process and controller simulator that responds in a consistent manner to disturbances of a predetermined pattern and rapidly and accurately portrays the effect of such disturbances upon the process and/or controller. It is a still further object of the invention to provide an improved method of determining what type of controller and what controller adjustments should be used to achieve optimum control of a given process. Other objects of the invention will be in part obvious and in part pointed out hereinafter.

I have found that the foregoing and other objects may be achieved in general by utilizing a process and controller analyzer comprising a plurality of electrical analogues of process and controller elements so arranged that they may be electrically interconnected to simulate a particular desired process and controller. The process simulator and/or controller simulator is connected to indicating means responsive to the value of a controllable variable of the process and an electrical disturbance of predetermined pattern is impressed upon the process or controller or a combination of process and controller in such manner that the indicating means is caused to depict the effect of the impressed disturbance. The many objects and advantages of the present method and apparatus may be best appreciated by reference to the accompanying drawings which illustrate a preferred embodiment of the apparatus of the invention and wherein—

Figure 1, as previously described, is a diagrammatic representation of a process with a controller applied thereto;

Figure 2 is a diagram indicating the equivalence of hydraulic capacity and electrical capacity;

Figure 3 is a diagram illustrating the equivalence of mechanical resistance and electrical resistance;

Figure 4 is a block diagram of a process and controller analyzer comprising the approximate electrical equivalent of the process and controller of Figure 1;

Figure 5 depicts the recovery transient of the controlled variable of the process as it appears on the oscilloscope screen of the present apparatus when a particular electrical disturbance is impressed upon the controlled process;

Figure 6 depicts a recovery transient that is obtained under somewhat different conditions than those used in the case of Figure 5;

Figure 8:
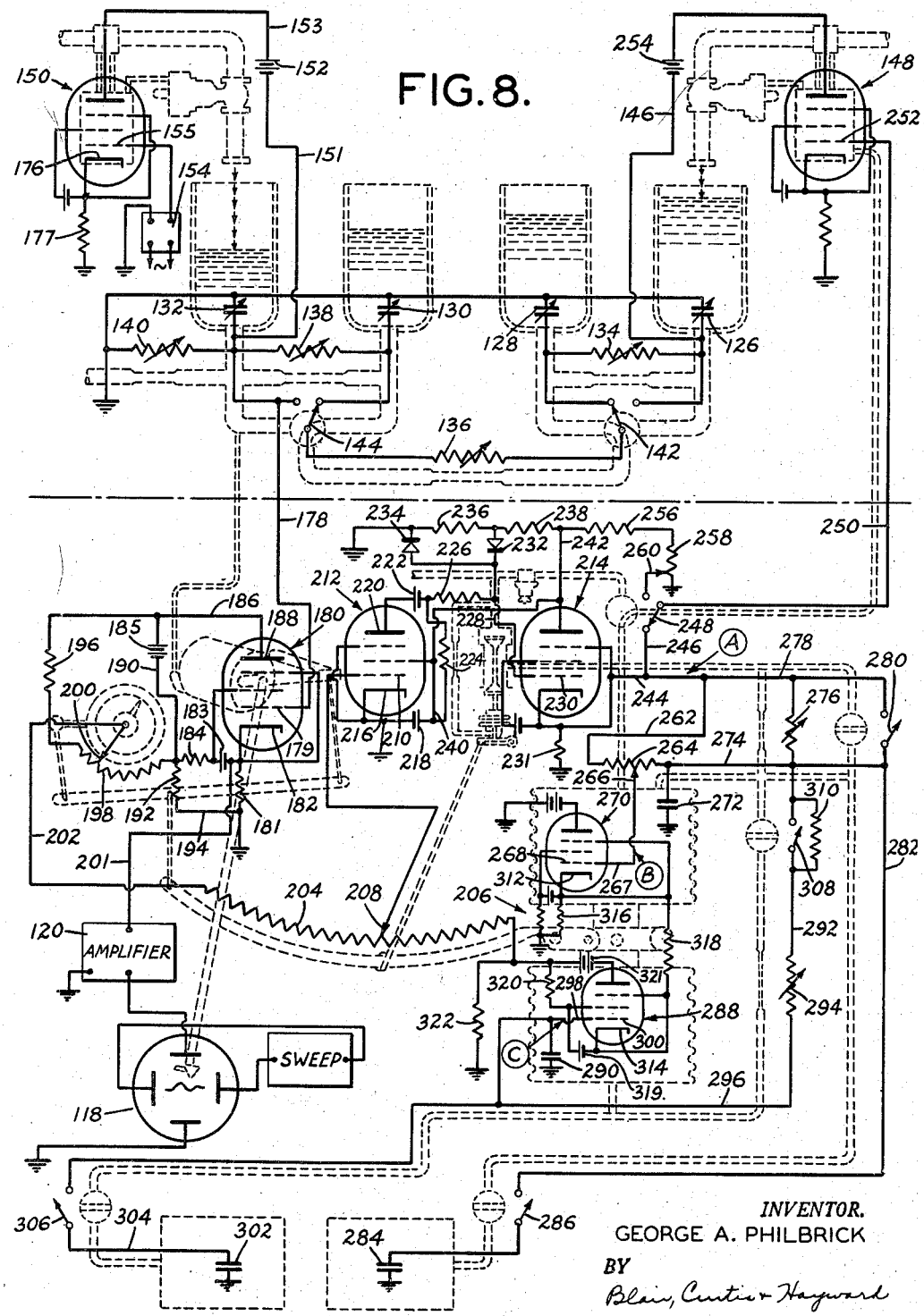

Figure 7 indicates the manner in which the proportioning band of the controller simulator may be varied;

Figure 8 is a phantom view of the hydraulic process and controller of Figure 1 with the analogous electrical elements of the present process and controller simulator approximately superposed on corresponding elements of the process and controller of Figure 1;

Figure 9 is a circuit diagram of disturber means including a movable contact for generating a predetermined electrical disturbance to be impressed on the process simulator of Figure 8;

Figure 10 is a modification of a portion of the electrical circuit of Figure 8, which modification permits simulation of the step adjustment of the derivative and reset effects as disclosed in my prior Patent 2,360,889.

It has been previously pointed out that the essential elements of a typical process are capacity and resistance. As indicated in Figs. 2 and 3, the electrical capacity 97 is equivalent to hydraulic capacity 99 which is similar to the tanks 10, 12, 14 and 16 of Fig. 1. In like manner the electrical resistor 100 is equivalent to the restriction 102 which is in turn similar to the hydraulic restrictions 18, 20, 22, and 34 of Fig. 1. Thus by substitution of electrical analogues for the process elements of the hydraulic process shown in Fig. 1 an electrical process may be obtained which is fully analogous to the hydraulic process, but may be made to respond much more rapidly to impressed disturbances. In a similar manner, the controller of Fig. 1 may be simulated by an electrical circuit, although in this case it is desirable that an electronic circuit be used in order that the various functions of the different parts of the controller may be accurately simulated.

Fig. 4 represents in a general way the principal elements of an electrical process and controller analyzer. Referring to Fig. 4, the analyzer there shown comprises a process simulator and a controller simulator, the output of the process simulator being connected to the input of the controller simulator and the output of the controller simulator being connected with the input of the process simulator to form a closed loop. The controlled process simulator 104 has an output voltage which represents the process variable that is to be controlled and is analogous to the level 16a in tank 16 of Fig. 1. This controlled variable voltage is applied to the input end of a controller simulator 106. The output of the controller simulator is a voltage that is transmitted to an electronic current controller 108 which supplies to the input end of the process simulator 104 a controlled current that is proportional to the output voltage of the controller simulator 106. The current controller 108 is analogous to the flow controller 32 of Fig. 1, the output voltage of the controller simulator 106 is analogous to the pressure in pipe 37, and the current supplied to the process simulator 104 by the current controller 108 is analogous to the flow of water through pipe 30.

Connected to the controller simulator 106 there is a reference voltage adjustor 110 that is analogous to the control point adjusting mechanism 46 of Fig. 1. The reference voltage adjustor 110 operates effectively to subtract from the controlled variable voltage a predetermined but adjustable reference voltage to produce a controlled voltage deviation. In cases where the controller being simulated is a reset controller, this reference voltage becomes the control point voltage of the simulator whereas in cases where the simulated controller is, for example, a proportioning controller and has no control point, the reference voltage becomes the center of the proportioning band of the simulated controller. Changes in the controlled voltage deviation are analogous to movements of end 50 of arc lever 52 in response to changes in the level 16a of tank 16.

In order to study the interaction of the process simulator and controller simulator means are provided for impressing an electrical disturbance of predetermined character on the process and controller loop and means are also provided for rendering perceptible the effect upon the process or controller or both of application of this predetermined disturbance. A periodic source of energy 114 is connected to an oscilloscope 118 and more particularly the circuit 116 which regulates the horizontal component of the sweep of the oscilloscope. The voltage at a particular point in the process and controller loop is amplified in an amplifier 120 and applied to the circuit which regulates the vertical component of the sweep of the oscilloscope 118. Connected to the same periodic source 114 there is an electrical disturber 122 adapted to apply to a predetermined point in the process and controller loop a recurring electrical disturbance of predetermined pattern, for example, a voltage that is periodically shifted back and forth between two predetermined values to produce a square wave. By synchronizing the period of recurrence of the disturbance pattern produced by the disturber 122 and the horizontal sweep period of the oscilloscope 118, the recovery transient 123 of the controlled variable voltage may be depicted on the oscilloscope screen just as in Fig. 1 the recovery transient 41 is depicted on chart 39.

Referring to Fig. 5 of the drawings, in a case where the disturbance pattern is of the character indicated, i. e., where the disturbing voltage alternates between two different values a double transient will appear on the oscilloscope screen. Since typically only one-half of the double transient is necessary for study of the process and controller it is usually desirable that one-half of the double transient be suppressed and this can be done by appropriately adjusting the sweep circuit of the oscilloscope, e. g., increasing the amplitude of the horizontal sweep of the oscilloscope in such manner that the portion of the transient between the dotted vertical lines in Fig. 5 is stretched out and, as shown in Fig. 6, a single recovery transient is depicted on the oscilloscope screen.

In order that the nature of the present invention may be more fully understood the details of the electrical connections of an illustrative process and controller analyzer embodying the present invention will now be described with particular reference to Fig. 8 of the drawings wherein the process and controller of Fig. 1 is shown in phantom view and analogous electrical elements of the present analyzer are either superposed on or located close to corresponding elements of the apparatus of Fig. 1. Referring to Fig. 8 there is shown a process simulator comprising a plurality of interconnected capacitors and resistors. The process simulator comprises the variable capacitors 126, 128, 130 and 132 which, as indicated in Fig. 8, correspond to the tanks 10, 12, 14 and 16, respectively of Fig. 1. The capacitors are made variable so that they can be adjusted to match the capacities of an actual or hypothetical process that it is desired to study. One side of each capacitor is grounded and the other side is effectively connected through resistance to another capacitor. Thus the capacitor 126 is connected to the capacitor 128 through a resistor 134; capacitor 128 is connected to the capacitor 130 through a resistor 136 and the capacitor 130 is connected to the capacitor 132 through a resistor 138. As indicated in Fig. 8 the electrical resistors 134, 136 and 138 are made variable so that they may be matched to the resistances of an actual process and they correspond to the restrictions 18, 20 and 22 respectively of the hydraulic process analogue. A further variable resistor 140, analogous to the resistor 34 of Fig. 1, is connected between the capacitor 132 and ground.

The electrical analogues of the three-way valves 21 and 23 of Fig. 1 are, in Fig. 8, the switches 142 and 144 which permit the interconnections between the capacitors and resistors to be varied to represent various systems.

The manipulated variable in the electrical analogue is a controlled electrical current supplied to the process simulator and more particularly to the capacitor 126 through a conductor 146 from an electronic tube 148 which may be a conventional pentode tube and which operates as a current controller in a manner described in detail hereafter. The output of the process simulator is a controlled variable voltage which is analogous to the level 16a in tank 16 of Fig. 1 and which forms the input of the controller simulator presently to be described.

In Fig. 1 a disturbance of predetermined character is impressed on the hydraulic process by causing a stream of water controlled by the flow controller 28 to flow through pipe 26 into tank 16. In Fig. 8 an electrical disturbance of predetermined character is impressed on the electrical process simulator in a somewhat similar manner. The capacitor 132 is connected into the plate circuit of a tube 150 through conductor 151, battery 152, and conductor 153 and the tube operates to supply a controlled and predeterminable current to the process simulator.

The characteristic of the current supplied to the process simulator by the tube 150 is determined by a disturber 154 connected to the control grid 155 of the tube. The disturber 154 may be constructed in such manner as to apply any of various disturbance patterns to the process. For example, it may comprise a simple circuit such as that shown in Fig. 9 which operates to apply a substantially square wave disturbance to the process. Referring to Fig. 9, the disturber 154 may comprise a vibrator 156 including an electromagnet 157 and an armature 158 having a coil 159 connected to a source of alternating current 160, all arranged as shown to cause the armature 158 to vibrate in synchronism with the frequency of the alternating current supply 160.

The armature 158 is mechanically connected to a pivoted arm 161 having mounted thereon a contact 162 which cooperates with a fixed contact 163 to alternately make and break the disturber circuit 164. Energy for the disturber circuit is supplied from a pair of batteries 165 and 166 connected in series to a potentiometer 167. A second potentiometer 168 is connected by a conductor 169 to a point between batteries 165 and 166 and by a conductor 170 to the adjustable contact 171 of potentiometer 167. Movable contact 162 is connected to conductor 170 by a conductor 172, and fixed contact 163 is connected to the adjustable contact 173 of potentiometer 168. The conductor 169 is grounded through conductor 174 and the adjustable contact 173 is connected by conductor 175 to the control grid 155 of the tube 150.

As the contacts 162 and 163 are made and broken, a predetermined portion of the potentiometer 168 is cut out of and into the circuit respectively to cause the control grid 155 to be maintained alternately at a relatively higher voltage and at a relatively lower voltage. The magnitude of the voltage difference between the high and low voltage values may be varied by moving contact 173 of potentiometer 168 and the value of both voltages with respect to ground may be varied by adjusting contact 171 of potentiometer 167.

Referring again to Fig. 8, the tube 150, like most of the other tubes shown in Fig. 8, is connected as a cathode-follower, i. e., a resistor is connected to the cathode, usually between cathode and ground, which resistor is common to the grid-cathode and cathode-anode circuits so that there is established through the resistor a current of such magnitude that the cathode voltage always follows the grid voltage, both such voltages being described with respect to "ground." Moreover the cathode voltage is always linearly related to the grid voltage and may be substantially equal to the grid voltage. Thus the cathode 176 of tube 150 is connected to ground through a resistor 177 and the cathode voltage is approximately equal to the voltage on control grid 155. Since the plate current is proportional to the cathode voltage, it is also linearly related to the grid voltage. Hence the current supplied to the capacitor 132 is so regulated that the desired square wave disturbance is impressed as a current on the process simulator.

The output of the process simulator is a controlled voltage analogous to the level 16a of tank 16. This controlled voltage is transmitted by means of a conductor 178, from one side of the capacitor 132 to the input of the controller simulator and more particularly to the control grid 179 of a tube 180 which, like the tubes 148 and 150, may be of a conventional pentode type. The tube 180, like the tube 150, is connected as a cathode-follower having a cathode resistance 181 through which the cathode 182 is connected to ground. The cathode circuit is specially energized by a battery 183 which connects it through a resistor 184 to the plate circuit of the tube. The plate circuit includes a battery 185, the positive terminal of which is connected to the plate 188 by a conductor 186 and the negative terminal of which is connected to ground through a conductor 190, resistor 192 (which has the same resistance as resistor 181) and conductor 194. Effectively connected in series to the terminals of battery 185 are a resistor 196 and the resistor of a potentiometer 198 having an adjustable contact 200 which is connected to the conductor 202. The potentiometer 198 is a reference voltage adjustor, like the adjustor 110 of Fig. 4.

The tube 180 and its associated circuit operates in a manner analogous to the operation of sensitive element 38 and control point setting device 46 of Fig. 1. The contactor 200 is so adjusted that the voltage drop between the contactor and the conductor 190 has a value equal to the desired reference voltage. This reference voltage is effectively subtracted from the controlled variable voltage, as described below, to give a controlled voltage deviation which, in the case of reset controllers, represents the departure of the controlled variable voltage from the desired control point.

As previously stated tube 180 is connected as a cathode-follower and thus a current is established in the cathode-anode circuit of the tube such that the cathode voltage is substantially equal or linearly related to the voltage on control grid 179. From this it follows that the voltage across the resistor 181 is equal to or linearly related to the controlled variable voltage impressed on control grid 179. Resistors 181 and 192 have substantially equal currents since all other paths to ground from the circuit of tube 180 are relatively of much higher resistance. Thus since resistors 181 and 192 have equal resistances and equal currents, the voltage drop across resistor 192 will be equal and opposite to the voltage drop arcoss the resistor 181. This voltage drop across resistor 192 is algebraically added to the drop through that portion of resistor 198 that is between contactor 200 and conductor 190, and hence the voltage with respect to ground that is established at the contactor 200 represents the difference between the controlled variable voltage and the reference voltage. This net voltage is referred to herein as the controlled voltage deviation.

As described in connection with Fig. 4 of the drawings, the effect of a predetermined disturbance is rendered perceptable by applying to the vertical sweep circuit of oscilloscope 118 the voltage at a desired point in the process and controller loop. In Fig. 8 the cathode 182 of tube 180 is connected by a conductor 201 to the amplifier 120 which is in turn connected to the vertical sweep circuit of oscilloscope 118. In this way the controlled variable voltage of the process simulator is effectively applied to the oscilloscope to depict the recovery transient of the controlled process when it is disturbed.

The controlled voltage deviation is transmitted through conductor 202 to one end of a potentiometer 204 having an adjustable contact 208. The other end of potentiometer 204 is connected to an electrical follow-up circuit generally designated as 206 and described in detail hereafter. The follow-up circuit 206 operates to establish at the right-hand end of potentiometer 204 (as shown in Fig. 8) a voltage that is so related to the controlled voltage deviation applied to the left-hand end of potentiometer 204 as to tend to cause the voltage at contactor 208 to be at ground potential. Thus the follow-up circuit 206 is analogous to the bellows assembly 56 of Fig. 1 and the resistor of potentiometer 204 is the electrical equivalent of the arc lever 52 of Fig. 1.

The voltage of adjustable contact 208 of potentiometer 204 is permitted to actuate the control grid 210 of a pentode tube 212. The contactor 208 is made adjustable so that the "proportioning band" of the controller simulator may be adjusted. If the contactor 208 is moved to the left end of potentiometer 204, a given change in the controlled voltage deviation will cause the follow-up circuit 206 to produce a large change in voltage at the right end of potentiometer 204 to maintain the grid-actuating voltage of contactor 208 at ground potential. If, on the other hand, contactor 208 is moved to the right end of potentiometer 204, the same change in controlled voltage deviation will cause the follow-up circuit 206 to produce a relatively small change in the voltage at the right end of potentiometer 204. For intermediate positions of contactor 208, voltages at the right end of potentiometer 204 of intermediate values will be produced by the given change in the controlled voltage deviation.

The tube 212 is connected with a tube 214 in such manner as to simulate the operation of the baffle-nozzle couple 64—66 and pneumatic relay 60 of Fig. 1. Tube 212 is a conventional amplifier and comprises a cathode-plate circuit including the cathode 216; battery 218, resistor 224, battery 222 and plate 220. The negative terminal of battery 222 is effectively connected through a resistor 226 and conductor 228 with the control grid 230 of tube 214. The tube 212 operates to impress upon control grid 230 a voltage proportional to the voltage at contactor 208 of potentiometer 204, but greatly amplified.

Referring back to the pneumatically operated controller of Fig. 1, it has been pointed out that the pneumatic relay 60 is supplied with air under pressure through pipe 58. The input pressure to the relay 60 usually has a definite predetermined value and hence the output pressure of the relay may vary only within fixed limits, i. e., atmospheric pressure and say 15 pounds per square inch above atmospheric pressure. These limits are, in effect, the limits of the proportioning band of the instrument. In order to produce a corresponding electrical analogue of these limits, the conductor 228 is connected to a circuit comprising rectifiers 232 and 234 and resistors 236 and 238. The rectifier 234 is interposed between conductor 228 and ground. This circuit is energized from battery 218 through conductors 240 and 242 in such manner that current flows from conductor 242 through resistors 238 and 236 in series to ground. The rectifier 232 is interposed between conductor 228 and the interconnection of resistors 236 and 238. Thus one side of rectifier 234 is maintained at ground potential and one side of rectifier 232 is maintained at a predetermined potential above ground.

The rectifiers 232 and 234 operate to maintain the voltage in conductor 228 and hence the voltage on control grid 230 between predetermined limits. If this voltage starts to rise above a predetermined maximum value equal to the voltage drop across resistor 236, current flows through rectifier 232 to ground to maintain the grid voltage no higher than this maximum value. If, on the other hand, the grid voltage drops below a predetermined minimum value, current flows through rectifier 234 from ground to prevent the grid voltage from dropping below the desired minimum value. The characteristic thus obtained is illustrated in Fig. 7 of the drawings which represents a plot of input voltage, i. e., the voltage in conductor 202 against output voltage, i. e., the voltage on control grid 230. The operation of the rectifiers 232 and 234 is such that the output voltage cannot exceed or fall below definite upper and lower limits. Within these limits the output voltage is maintained proportional to the input voltage by the action of follow-up circuit 206 as previously described, and the proportionality between input and output voltage may be varied by adjustment of contact 208 of potentiometer 204. The resistor 226 operates to limit flow of current into the grid circuit of tube 214 so that the rectifiers 232 and 234 can operate effectively to maintain the grid voltage between the desired predetermined limits.

Tube 214, like tubes 150 and 180, is connected as a cathode-follower and its cathode voltage is equal to or linearly related to the voltage on grid 230; i. e., the voltage across resistor 231. This cathode voltage of tube 214 constitutes the effective output of the tube.

The output voltage of tube 214 like the output pressure of relay valve 60 performs several different functions. Thus the output of tube 214 is applied through conductors 244 and 246, a switch 248 and conductor 250 to the control grid 252 of tube 148. The tube 148 is connected as a cathode follower and operates like tube 150 as a current controller. The plate circuit of tube 148 includes a battery 254, the negative terminal of which is connected by the conductor 146 to one side of capacitor 126. The tube operates to cause a current flow in conductor 146 that is proportional to the voltage impressed on control grid 252 and this current is the manipulated variable of the process simulator.

Under certain circumstances it is desirable to place the process simulator under manual control and for this purpose conductor 250 may be connected, by adjustment of switch 248, to a manual control circuit comprising a fixed resistor 256 connected through conductors 242 and 240 to the battery 218 and a potentiometer 258 having an adjustable contact 260 which may be connected to the conductor 250 through switch 248. One end of potentiometer 258 is grounded so that by manual adjustment of the adjustable contact 260 the voltage impressed upon control grid 252 may be varied to cause the tube 148 to supply a desired current to the process.

When switch 248 is so adjusted as to interconnect conductors 246 and 250 the process and controller simulator is "on automatic control" and the simulator may be adjusted to simulate various types of automatic controllers adjusted in various ways. Referring to the lower right-hand portion of Fig. 8 there is shown an electrical analogue of the bellows assembly 56 of Fig. 1. Conductor 244 is connected by a conductor 262 to one end of a potentiometer 264 which is provided with an adjustable contact 266 connected by a conductor 267 to the control grid 268 of a tube 270. The other end of potentiometer 264 is connected to capacitor 272 which is grounded and to a conductor 274, which through a variable resistor 276 and conductor 278 is connected to conductor 244. The capacitor 272, potentiometer 264 and resistor 276 are so connected to conductor 244 as to simulate the operation of the inner bellows 74, outer bellows 76, and restriction 78 of bellows assembly 56.

Adjustment of the contact 266 of potentiometer 264 is analogous to varying the relative areas of the bellows 74 and 76. If, for example, contact 266 is moved to the left end of potentiometer 264 (as shown in Fig. 8), the output voltage of tube 214 is impressed directly on the control grid 268 of tube 270 and hence the operation is similar to that which would result if the inner bellows 74 were made substantially as large as outer bellows 76 so that the entire upper bellows area is directly and immediately responsive to the relay output pressure. If, on the other hand, the contact 266 is moved to the right-hand end of potentiometer 264, changes in voltage on grid 268 caused by changes in output of tube 214 must pass through the resistor of potentiometer 264 and the resistor 276 and hence the effect is analogous to that of reducing the diameter of inner bellows 74 to zero so that the force available for moving end 54 of lever 52 can be varied only by flow of air through restriction 78 to the bellows 76. By suitable adjustment of contact 266 to an intermediate point on potentiometer 264 different relative bellows areas may be simulated.

The voltage on the control grid 268 is a composite of the voltage applied through conductor 262 and the voltage applied through that portion of the circuit comprising resistor 276 and capacitor 272, just as the force exerted on the end 54 of lever 52 is a composite result of the forces exerted by the inner and outer bellows 74 and 76. Thus the electrical circuit shown in Fig. 8 permits simulation of the derivative effect of a derivative controller with or without the inner bellows 74. The derivative effect may be removed by closing a shunt 280 around resistor 276 in the same manner that valve 92 of Fig. 1 may be opened to bypass the restriction 78.

In order to supplement the capacity of the capacitor 272 there is connected to conductor 274 by a conductor 282 a second capacitor 284 which is grounded and can be selectively connected to the conductor by a switch 286. The capacitor 284 is analogous to the capacity tank 84 of Fig. 1 and the switch 286 analogous to the valve 88 of Fig. 1.

To provide for simulation of the reset effect produced by bellows 80 of Fig. 1 the output of tube 214 is conducted to a second circuit comprising a tube 288 and a capacitor 290. The output of tube 214 is conducted through conductors 244 and 278, through either resistor 276 or shunt switch 280 and through switch 308, which is closed to produce the reset effect, to a conductor 292, thence through a variable resistor 294 and conductor 296 to capacitor 290, the other side of which is grounded. Conductor 296 is also connected by a conductor 298 with the control grid 300 of tube 288. The variable resistor 294 and capacitor 290 are analogous to the restriction 82 and bellows 80 of Fig. 1, and operate in an analogous manner to cause a voltage to be impressed upon control grid 300 that is the same as the voltage of capacitor 290 and corresponds with the pressure in reset bellows 80.

An auxiliary capacitor 302 is connected by a conductor 304 through a switch 306 to conductor 296 and capacitor 290. The auxiliary capacitor 302 is analogous to capacity tank 86 of Fig. 1 and switch 306 is analogous to the valve 90 of Fig. 1. By means of the auxiliary capacitor 302 the capacity of the reset portion of the circuit may be varied to change its time constant and so the reset rate.

In order to prevent shifting of the neutral position of the recovery transient as it appears on the screen of oscilloscope 118, the switch 308 in conductor 292 is provided with a high resistance shunt 310. The switch 308 is opened when it is desired to eliminate the reset effect, and when this switch is opened, the resistance 310 causes the charge on capacitors 290 and 302 to leak off relatively slowly and thereby prevents a noticeable shift in position of the recovery transient as it appears on the oscilloscope screen.

The tubes 288 and 270 are so interconnected that their outputs are subtracted from one another and the net output applied to the right-hand end of potentiometer 204 in the same way that the pressure difference between bellows 74—76 and bellows 80 positions the right end of lever 52. This result is accomplished as follows: The tube 270 is connected as a cathode follower and operates in such manner that the voltage of its cathode 312; i. e., the voltage across cathode resistor 316, is maintained substantially equal to or in linear relation to the potential on its control grid 268. Tube 288 is provided with a cathode 314 and operates in such manner that the potential of its cathode 314 is maintained substantially equal to or in linear relation to the voltage impressed upon its control grid 300. Cathode 312 of tube 270 is connected to ground through cathode resistor 316 and to the cathode 314 of tube 288 through a resistor 318. Cathode 314 of tube 288 is also connected to its plate through battery 319, resistor 320 and battery 321. The right-hand end of potentiometer 204 is connected to the plate of tube 288 through battery 321 and also to ground through a resistor 322. Since the cathodes 312 and 314 are interconnected through resistor 318, the difference in potential between the two cathodes is the voltage drop across resistor 318, and hence the current flow through resistor 318 is proportional to the voltage difference between the two cathodes. This current flow through resistor 318 is substantially equal to the current flow through resistor 322 (potentiometer 204 has a relatively high resistance and hence current flow therethrough may be neglected). Resistors 318 and 322 are made of equal resistance and since the currents flowing through the two resistors are equal the voltage drops across the two resistors are equal. Therefore the potential of the right-hand end of potentiometer 204 above ground is equal to the voltage drop across resistor 318 which is in turn equal to the voltage difference between the two cathodes 312 and 314. Thus the tubes 270 and 288 with their associated elements and electrical connections operate to impress a voltage on the right-hand end of potentiometer 204 which is a function of the algebraic sum of the proportioning, reset and derivative effects and hence they operate in a manner analogous to bellows assembly 56 of Fig. 1.

The operation of the simulator of Fig. 8 is largely apparent from the foregoing description. The switches 142 and 144 of the process simulator are adjusted to so interconnect the capacitors and resistors as to simulate a specific type of system as desired. The capacitors 126, 128, 130 and 132 and the resistors 134, 136, 138 and 140 are then adjusted to provide the proper amount of capacity and resistance to simulate as closely as possible a process that is to be controlled. The disturber 154 is adjusted to impress the desired disturbance pattern on the process and the resulting behavior of the controlled variable voltage at the output end of the process simulator is continuously depicted on the screen of oscilloscope 118.

The variable elements of the controller simulator may then be adjusted to observe the effect of the different adjustments upon the behavior of the controlled variable voltage. For example, the proportioning band of the controller simulator may be varied by moving contact 208 along potentiometer 204; the derivative effect may be varied by adjusting resistor 276, and contact 266 of potentiometer 264; and the reset effect may be varied by adjusting resistor 294. By adjusting these variable elements of the controller simulator and observing the effect of the adjustments on the behavior of the controlled variable voltage it is easily possible to determine within, say a few minutes, what type of controller may be most advantageously used to control the selected process and which adjustments produce an optimum recovery transient of the controlled variable voltage, i. e., which adjustments bring the output voltage of the process back to its control point rapidly and without undue cycling across the control point. The electrical values of the variable elements of the controller simulator bear a predetermined relationship to the values of corresponding elements of the pneumatic controller of Fig. 1, and hence when the controller simulator has been adjusted to produce an optimum recovery transient of the controlled variable voltage, the corresponding values for the pneumatic controller may be easily determined.

It is apparent that the simulator of the present invention may be used in an unusually effective manner to determine the adjustments of a pneumatic controller which will produce optimum control of a particular process. The response of the electrical process to an impressed disturbance is for all practical purposes instantaneous and hence there is no visually perceptible delay between the time when a given adjustment is made and the time when the effect of such an adjustment is depicted on the oscilloscope screen. As pointed out above, this condition does not ordinarily obtain when a pneumatic controller is applied to a multiple capacity industrial process. If an attempt is made to adjust the pneumatic controller directly, a considerable period of time may elapse between the time when a variable component of the controller is adjusted and the time when the effect of the adjustment becomes perceptible. This delay becomes extremely troublesome where the process is both slow and complicated. By using the present simulator the prerequisites for optimum control may be determined, in most cases, in a matter of a few minutes as compared with previous methods wherein hours or even days were required to arrive at optimum adjustments of the controller.

Moreover the reactions of the simulator are sufficiently rapid to permit them to be effectively represented on an oscilloscope screen. When a rapidly recurring disturbance is impressed on the process and controller loop, the resulting process recovery transients may be depicted on the oscilloscope screen at such a speed that the successive transients appear to be a single transient. As the analogues of the various controller components are adjusted the shape of the transient represented on the screen changes and the effect of each adjustment becomes immediately perceptible.

The present simulator may also be used in determining the proper type of controller and proper type of controller adjustments to be used in controlling a process having unknown characteristics. The method of using the simulator to achieve this result comprises, as a first step, applying a known disturbance to the manipulated variable of an uncontrolled process having unknown characteristics and recording the effect of the known disturbance on the process variable that is to be controlled. The curve representing the behavior of the controlled variable of the unknown process when disturbed in a predetermined manner is then taken to the point at which the simulator is located. The equivalent disturbance is applied to the electrical process of the simulator and the resistances and capacities of the process simulator (without controlling the process) are adjusted to produce on the oscilloscope screen a curve that matches the curve produced by the unknown process. It has been found as a result of numerous tests that when the empirically determined curve matches the curve produced on the oscilloscope screen the controllability characteristics of the electrical process are, within close limits, the same as the controllability characteristics of the unknown process. The variable components of the controller simulator may then be adjusted to produce an optimum recovery of the process variable and the adjustments of the controller simulator which produce this optimum recovery of the process variable noted. The automatic controller on the unknown process is then adjusted in a manner that corresponds with the settings of the controller simulator and optimum control of the uiknown process is thereby achieved.

It will be apparent to those skilled in the art that the simulator of Fig. 8 may, by relatively minor modifications, be caused to simulate a wide variety of control effects. In order to illustrate the manner in which the simulator of Fig. 8 may be modified there is shown in Fig. 10 of the drawings a circuit that may be substituted for the derivative and reset portions of the simulator of Fig. 8 to cause the simulator to simulate the stepwise adjustment of derivative and reset effect that is disclosed in my prior Patent No. 2,360,889. As pointed out in my patent, the number of independent adjustments of a pneumatic controller may be reduced by establishing a predetermined relationship between the reset and derivative adjustments of the controller as disclosed in my patent and coadjusting these two effects in a step-wise fashion. This stepwise adjustment of derivative and reset effect may be simulated by using the circuit shown in Fig. 10.

Referring to Fig. 10 a plurality of capacitors 320, 322, 324, 326 and 328 are individually connected in series with resistors 330, 332, 334, 336 and 338, respectively and the individual capacitors and their associated resistors are connected in parallel with one another, as shown in Fig. 10, with resistor 340 interposed between the resistors 330 and 332; resistor 342 between the resistors 332 and 334; resistor 344 between the resistors 334 and 336; and resistor 346 between the resistors 336 and 338. A resistor 348 is connected at one end to a point between resistors 338 and 346 and at its other end through a conductor 350 with the capacitor 352. One side of each of the capacitors 320, 322, 324, 326, 328 and 352 is connected to ground. The other sides of capacitors 322, 324, 326 and 328 are connected respectively to switches 354, 356, 358 and 360, respectively which are interconnected by a conductor 362. A variable resistor 364 and a potentiometer 366 having an adjustable contact 368 are connected at one end to the conductor 362 and at their other ends to each other.

The circuit of Fig. 10 is provided with three leads (connections A, B and C) by means of which it may be connected to the controller simulator circuit of Fig. 8. These leads are a conductor 370 (connection A) connected to a point between the resistor 364 and potentiometer 366, a conductor 372 (connection B) connected to the adjustable contact 368, and a conductor 374 (connection C) connected to conductor 350 at a point intermediate the resistor 348 and the capacitor 352.

Referring again to Fig. 8, when it is desired to simulate the step adjustment of derivative and reset effect disclosed in my prior patent, the variable reset and derivative analogues of the controller simulator are removed from the circuit by breaking conductor 278 at point A; conductor 267 at point B; and conductor 298 at point C.

The circuit of Fig. 10 is then connected in such manner that conductor 370 is connected to the cathode of tube 214; conductor 372 to the control grid of tube 270; and conductor 374 to the control grid of tube 288. The desired simulation of the stepwise adjustment of derivative and reset effect may be achieved by successively closing the switches 354, 356, 358 and 360. As successive switches are closed, the magnitudes of the derivative and reset effects are varied in predetermined steps. Thus by adjustment of the switches 354—360, the effect of such a stepwise adjustment of derivative and reset upon the behavior of the controlled variable for various different types of processes may be depicted on the screen of the oscilloscope and effectively analyzed and studied.

It is apparent that the simulator circuit of Fig. 8 may be modified in many ways other than that indicated in Fig. 10. Thus, for example, the predetermined disturbance need not necessarily be applied to the capacitor 132 but may be applied to any point in the process and controller loop and it may have a pattern other than the square wave pattern illustratively disclosed. Similarly, the variable depicted on the oscilloscope screen need not be the voltage at capacitor 132 of the process simulator but may be any other voltage or current in the process and controller loop. For example, the controlled variable voltage represented on the oscilloscope screen may be the voltage at the capacitor 128 or the capacitor 130 and the controller simulator may be made responsive to these voltages. As indicated above the process to be simulated may be a mechanical process instead of a hydraulic or thermal process. If inertia is present in the process it may ordinarily be simulated by a suitable electrical capacitance. The process simulated may be a "dead end" system or a "branched" system such as results when the switches 142 and 144 of Fig. 8 are shifted to connect capacitors 126 and 132 through resistor 136. Other modifications within the scope of the invention will be apparent to those skilled in the art.

I claim:

1. A process and controller analyzer comprising, in combination, a process simulator including a plurality of electrical analogues of process elements, a controller simulator including a plurality of electrical analogues of controller elements, said process simulator and controller simulator being interconnected to form a closed loop and said controller simulator including first electronic current controlling means for supplying a controlled current to said process simulator, second electronic current controlling means for supplying a controlled current to said loop, disturbing means for governing said second current controlling means to cause said controlling means to supply to said loop an electrical current having a predetermined disturbance pattern, and electrical indicating means responsive to the voltage at a predetermined point in said loop for indicating the effect of said disturbance on a predetermined portion of said loop.

2. A process and controller analyzer comprising, in combination, a process simulator including a plurality of interconnected electrical capacities and resistances and having an input current and an output comprising a controlled variable voltage, a controller simulator connected to the input and output of said process simulator to form a closed loop, said controller simulator including first electronic means responsive to said controlled variable voltage for establishing a controlled voltage deviation and second electronic means responsive to said controlled voltage deviation for regulating said input current to cause said current to assume a value in predetermined relationship with said controlled voltage deviation, disturbing means connected to said loop and adapted to impress on said loop an electrical disturbance having a predetermined pattern, and electrical indicating means connected to said loop to indicate visually the effect of said disturbance upon a predetermined portion of said loop.

3. A process and controller analyzer comprising, in combination, a process simulator including a plurality of interconnected electrical capacities and resistances and having an input current and an output comprising a controlled variable voltage, a controller simulator connected to the input and output of said process simulator to form a closed loop, said controller simulator including first electronic means responsive to said controlled variable voltage for establishing a controlled voltage deviation, second electronic means responsive to said controlled voltage deviation for establishing an amplified voltage proportional to said voltage deviation and third electronic means responsive to said amplified voltage for maintaining said input current proportional to said voltage deviation, disturbing means connected to said loop and adapted to impress on said loop an electrical disturbance having a predetermined pattern, and electrical indicating means connected to said loop to indicate visually the effect of said disturbance upon a predetermined portion of said loop.

4. A process and controller analyzer comprising, in combination, a process simulator including a plurality of interconnected electrical capacitors and resistors and having an input current and an output comprising a controlled variable voltage, a controller simulator including a plurality of electrical analogues of controller elements, said controller simulator being connected to the input and output of said process simulator to form a closed loop and said controller simulator including first electronic means responsive to said controlled variable voltage for establishing a controlled voltage deviation, second electronic means responsive to said controlled voltage deviation for establishing an amplified voltage proportional to said voltage deviation, third electronic means responsive through resistance and capacity to said amplified voltage for causing said amplified voltage to assume a rate of change proportional to said controlled voltage deviation and fourth electronic means responsive to said amplified voltage for regulating the input current to said process simulator, disturbing means connected to said loop and adapted to impress on said loop an electrical disturbance having a predetermined pattern, and electrical indicating means connected to said loop to indicate visually the effect of said disturbance upon a predetermined portion of said loop.

5. A process and controller analyzer comprising, in combination, a process simulator including a plurality of electrical capacities and resistances and having an input current and an output comprising a controlled variable voltage, a controller simulator connected to the output and input of said process simulator to form a closed loop, said controller simulator including first electronic means responsive to said controlled variable voltage for establishing a controlled voltage deviation, second electronic means responsive to said controlled voltage deviation for establishing an amplified voltage proportional to said deviation, third electronic means responsive through resistance and capacity to said amplified voltage for changing the value of said amplified voltage by an amount proportional to the rate of change of said controlled voltage deviation and fourth electronic means responsive to said amplified voltage for regulating said input current to said simulator, disturbing means connected to said loop and adapted to impress on said loop an electrical disturbance having a predetermined pattern, and electrical indicating means connected to said loop to indicate visually the effect of said disturbance upon a predetermined portion of said loop.

6. A process and controller analyzer comprising, in combination, a process simulator including a plurality of interconnected electrical capacities and resistances and having an input current and an output comprising a controlled variable voltage, a controller simulator connected to the input and output of said process simulator to form a closed loop, said controller simulator including first electronic means responsive to said controlled variable voltage for establishing a controlled voltage deviation, second electronic means responsive to said controlled voltage deviation for establishing an amplified voltage proportional to said voltage deviation, third electronic means responsive through resistance and capacity to said amplified voltage for causing said amplified voltage to assume a rate of change proportional to said voltage deviation, fourth electronic means responsive through resistance and capacity to said amplified voltage to cause said amplified voltage to change by an amount proportional to the rate of change of said voltage deviation, and fifth electronic means responsive to said amplified voltage for regulating the input current to said process simulator, disturbing means connected to said loop and adapted to impress on said loop an electrical disturbance having a predetermined pattern, and electrical indicating means connected to said loop to indicate visually the effect of said disturbance upon a predetermined portion of said loop.

G. A. PHILBRICK.

REFERENCES CITED

The following references are of record in the file of this patent:

UNITED STATES PATENTS

| Number | Name | Date |
|---|---|---|
| 2,040,086 | Goodwillie | May 12, 1936 |
| 2,067,645 | Pinkerton | Jan. 12, 1937 |
| 2,159,181 | Ryder | May 23, 1939 |
| 2,165,182 | Luhrs | July 4, 1939 |
| 2,373,504 | Schlieben | Apr. 10, 1945 |
| 2,420,891 | McCann | May 20, 1947 |
| 2,423,754 | Bruce | July 8, 1947 |
| 2,431,696 | Keister | Dec. 2, 1947 |

OTHER REFERENCES

Transactions of the A. I. E. Journal, February 1946, pages 91–96.

Publication from the Massachusetts Institute of Technology, Serial No. 110, "Hydraulic Analysis of Water Distribution Systems by Means of an Electric Network Analyzer," June, 1935.